(No Model.)

2 Sheets—Sheet 1.

J. A. KIRKPATRICK.
ROAD CART.

No. 512,716.

Patented Jan. 16, 1894.

Witnesses
Jas. K. McCathran
N. F. Riley

Inventor
John A. Kirkpatrick
By his Attorneys,
C.A.Snow & Co.

(No Model.) 2 Sheets—Sheet 2.

J. A. KIRKPATRICK.
ROAD CART.

No. 512,716. Patented Jan. 16, 1894.

Witnesses
Jas K. McCuthran
N. J. Riley

Inventor
John A. Kirkpatrick
By his Attorneys,
C.A. Snow & Co.

UNITED STATES PATENT OFFICE.

JOHN A. KIRKPATRICK, OF CHICAGO, ILLINOIS, ASSIGNOR OF ONE-HALF TO GEORGE W. McDANIELS, OF ANTHONY, KANSAS.

ROAD-CART.

SPECIFICATION forming part of Letters Patent No. 512,716, dated January 16, 1894.

Application filed February 18, 1893. Serial No. 462,847. (No model.)

*To all whom it may concern:*

Be it known that I, JOHN A. KIRKPATRICK, a citizen of the United States, residing at Chicago, in the county of Cook and State of Illinois, have invented a new and useful Road-Cart, of which the following is a specification.

The invention relates to improvements in road carts.

The objects of the present invention are to improve the construction of road carts, to effectually prevent horse-motion being communicated to the occupant of the vehicle, and to provide a support for the body of the road cart capable of yielding to the slightest movement, and at the same time of withstanding the strains incident to the heaviest loads.

A further object of the invention is to avoid all noise and rattle and to enable the body or seat to be readily balanced to accommodate a light or heavy load.

The invention consists in the construction and novel combination and arrangement of parts hereinafter fully described, illustrated in the accompanying drawings and pointed out in the claims hereto appended.

Figure 1:
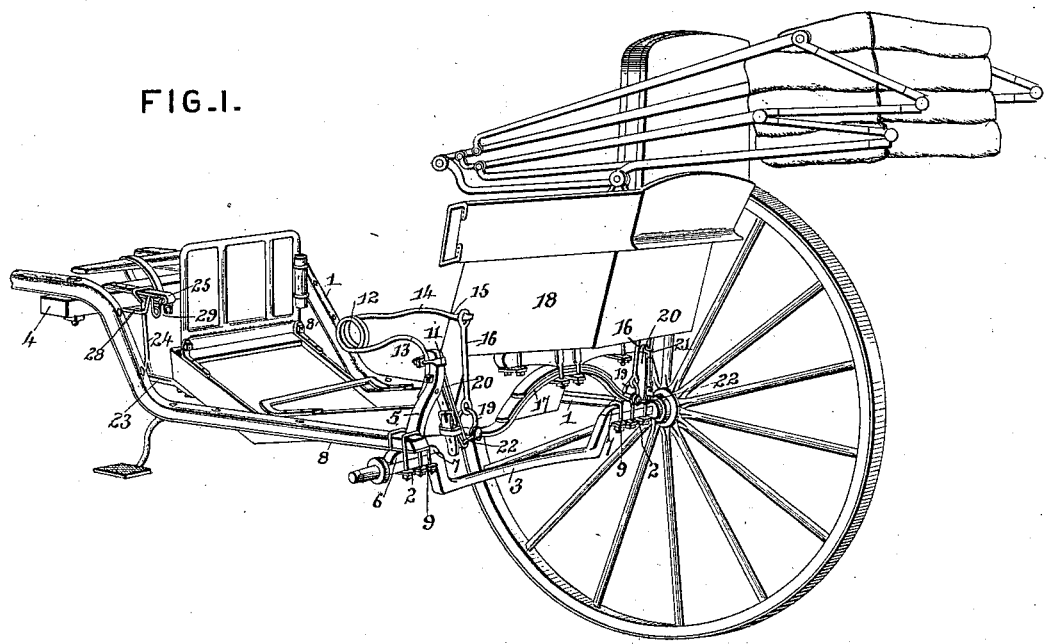
Figure 2:
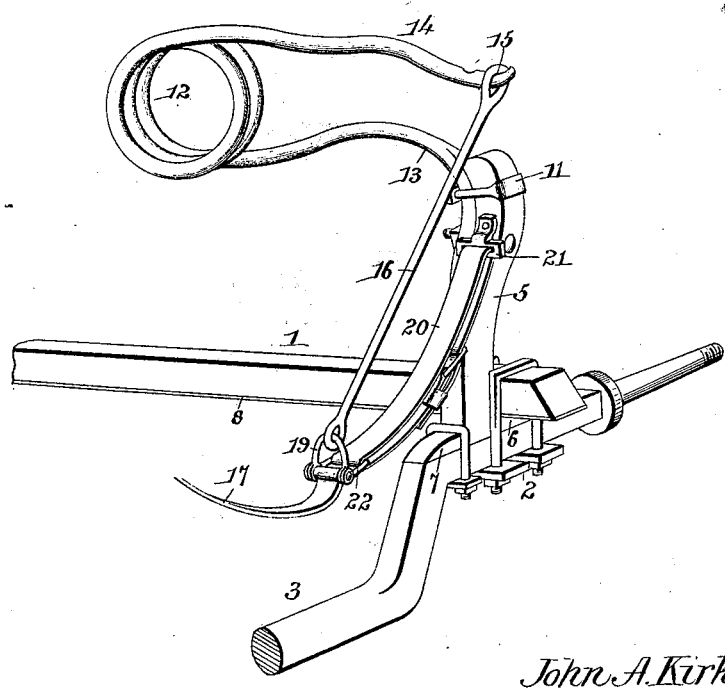
Figure 3:
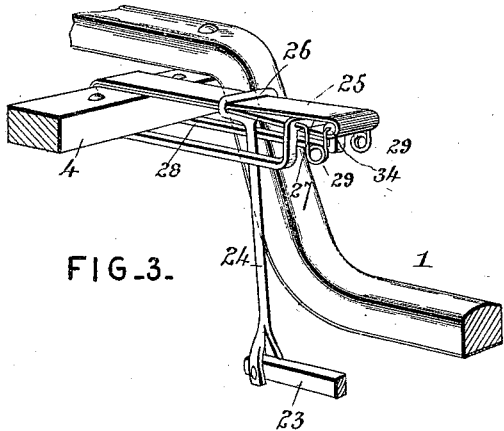
Figure 4:
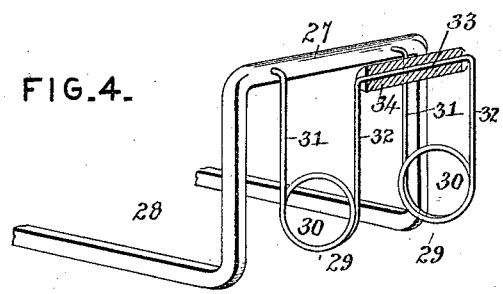
Figure 5:
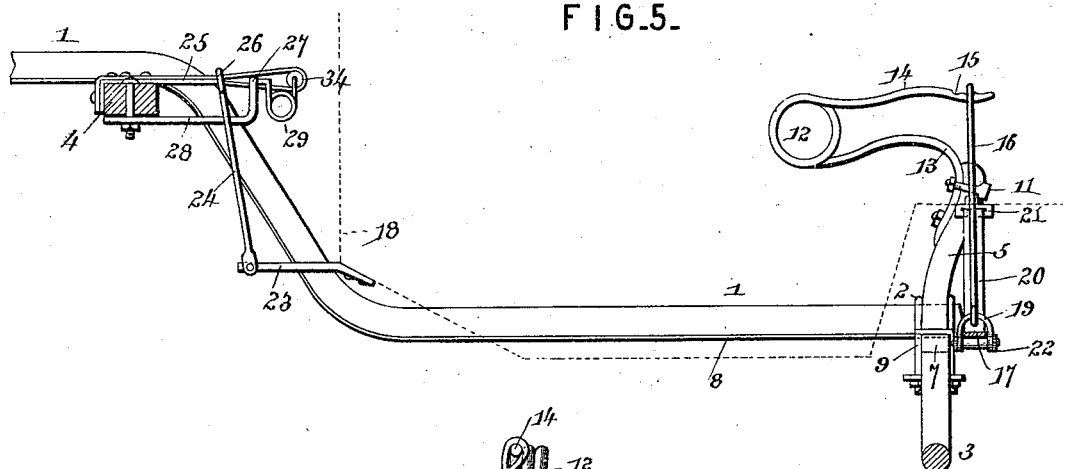
Figure 6:
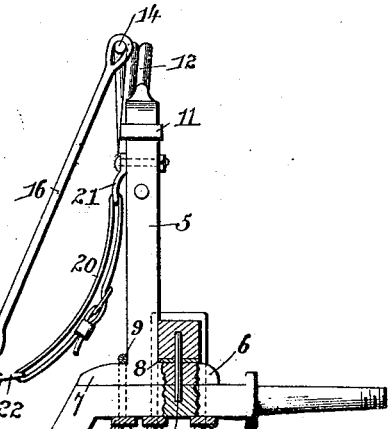

In the drawings—Figure 1 is a perspective view of a road cart embodying the invention, one of the wheels being removed. Fig. 2 is a detail perspective view showing one of the rear supporting springs and the connection with the axle. Fig. 3 is a similar view illustrating the manner of supporting the front of the body. Fig. 4 is a detail perspective view of one of the double springs. Fig. 5 is a longitudinal sectional view. Fig. 6 is a detail view partly in section showing one end of the axle and one of the standards.

Like numerals of reference indicate corresponding parts in all the figures of the drawings.

1, 1 designate shafts each of which has its rear end secured by a double clip 2 to a drop axle 3 near the spindles thereof. The shafts extend forward horizontally from the axle 3 and have an upward bend in rear of a crossbar 4, which connects them. The double clip also serves for securing to the axle a T-shaped standard 5 having its arms 6 and 7 arranged on the axle; the arm 6 is interposed between the axle and the shaft 1; which is provided on its lower face with a metal strengthening plate 8; and the arm 7 is secured by a clip 9. A blind bolt 10 extends through the arm 6 upward into the shaft and downward into the axle, and serves to hold the parts securely in proper position. The upper end of the standard 5 is curved and has secured to it by a clip 11 and a bolt, a lower curved arm of a rear supporting coiled spring 12. Each coiled supporting spring 12 is provided with the said lower arm 13 and with an upper arm 14, which extends rearward from the coils and terminates over the axle and is provided with a series of notches 15 to permit an adjustment of a link 16. The link 16 extends downward from the arm 14 of the coiled spring 12 to one end of a transversely disposed leaf spring 17, which is secured to a spring bar and thereby connected with a body 18, supported at its rear by the leaf spring. The ends of the link 16 are provided with eyes. The upper one fits on the end of the arm 14 and engages one of the notches thereof, and the lower one is linked into a stirrup 19 of the leaf spring. By adjusting the upper end of the link 16 from one notch to another the body may be arranged and properly balanced over the axle to accommodate a light or heavy load.

In order to protect the supporting springs against heavy strains a stay strap 20 is arranged at each side of the cart and is connected with the standard 5 and the leaf spring 17 by loop plates 21 and 22, secured respectively to the standard and the leaf spring. The stay strap is passed through the loops of said plates 21 and 22 and permits the supporting springs 12 to have a limited play to allow them to readily yield to the slightest motion; and the stay straps are adapted in case of a heavy load to take the strain from the supporting springs and to support the load; and they also serve as means for supporting the body and connecting the leaf spring with the standards should the supporting springs become broken or injured.

The body of the vehicle has extending forward from each side of its front a bar 23 which is connected by a link 24 with a yielding strap 25, extending rearward from the cross-bar 4. The lower end of the link 24 is bifurcated and is pivotally connected to the bar 23; and the upper end of the link is provided with a flattened eye 26 to receive the strap 25. The strap 25 is doubled and has its ends secured to the cross-bar 4 and receives within it near its rear end or bend a cross-bar or piece 27 of an approximately U-shaped supporting frame 28, which has the forward ends of its sides secured to the lower face of the cross-bar 4. The rear portion of the supporting frame 28 curves upward and a double coiled spring 29 is interposed between the cross-piece 27 of the supporting frame and the rear end of the folded strap 25 to take up any longitudinal movement of the body. The double spring 29 is provided with opposite coils 30, from each of which extend upwardly projecting front and rear arms 31 and 32, the latter arm of each pair being connected by an integral portion 33 having a bar or roll 34 to fit in the bend of the strap. The front arms 31 of the double spring are secured to the cross-piece 27 of the supporting frame at each side of the strap. These front springs 29 permit the parts to yield readily to the slightest movement; and the arrangement of the straps and supporting frames affords a limited play for the springs and provides a secure support adapted to hold the heaviest loads to which road carts are subjected.

The arrangement and construction of the front and rear supports for the body are perfectly noiseless and free from rattling. The front supports provide delicate tension springs just sufficient to balance the body of the cart and protect the same from the slightest regular jar or horse motion.

It will be seen that the arrangement of the parts effectually removes all horse motion, that it is adapted to yield to the slightest movement, and that at the same time it is capable of supporting the heaviest weights, to which a road cart is subjected.

It will be apparent that the body is balanced over the axle in a swing formed by the rods attached to the rear supporting coiled springs; and the links, which are connected to the yielding straps, support the body in its proper equipoise over the axle.

Changes in the form, proportion and the minor details of construction may be resorted to without departing from the principle or sacrificing any of the advantages of this invention.

What I claim is—

1. In a road cart, the combination of an axle, a standard secured to the axle, a rear supporting coiled spring having a lower arm secured to the standard, and an upper arm terminating over the axle and provided with notches, a body, a leaf spring secured to the body, and a link having its lower end connected to the leaf spring and provided at its upper end with an eye to fit on the upper arm of the supporting coiled spring and engage one of the notches thereof, substantially as described.

2. In a road cart, the combination of an axle, a T-shaped standard secured to the axle and having its upper portion curved, a rear supporting coiled spring having a lower curved arm secured to the standard and an upper arm terminating over the axle, a body provided with a leaf spring, and a link connected to the leaf spring and the upper arm of the supporting spring, substantially as described.

3. In a road cart, the combination of an axle, a standard secured to the axle, a rear supporting coiled spring having a lower arm secured to the standard and provided with an upper arm terminating over the axle, a body provided with a leaf spring, a link connected to the leaf spring and to the upper arm of the supporting spring, and a stay strap connected to the standard and to the leaf spring and limiting the play of the springs, substantially as described.

4. In a road cart, the combination of an axle, a standard secured to the axle and having its upper end curved, a rear supporting coiled spring having a curved lower arm secured to the standard and provided with an upper arm terminating over the axle, a leaf spring, a link connected to the upper arm of the supporting spring and to the leaf spring, loops arranged on the standard and on the leaf spring, and a stay strap secured to the loops, substantially as and for the purpose described.

5. In a road cart, the combination with shafts and a body, of a yielding strap, a supporting frame having its rear end arranged adjacent to the rear end of the strap, a spring interposed between the supporting frame and the strap, and a link connected to the strap and with the body, substantially as described.

6. In a road cart, the combination with a body and shafts having a cross-bar, of a supporting frame secured to the cross-bar and extending rearward therefrom, a doubled strap secured to the cross-bar and receiving the rear end of the supporting frame, a spring interposed between the rear end of the strap and the supporting frame, and the link connected to the strap and to the body, substantially as described.

7. In a road cart, the combination with a body and shafts having a cross-bar, of an approximately U-shaped supporting frame secured to the cross-bar and having its rear end bent upward, a folded strap attached to the cross-bar and extending rearward therefrom and receiving the supporting frame, a double coiled spring having upwardly extending front arms secured to the supporting frame and rear arms having their upper ends secured to a bar arranged in the strap at the rear end thereof, and a link provided at its upper end with an eye receiving the strap and having its lower end connected with the body, substantially as described.

8. In a road cart, the combination of an axle, standards secured to the axle, shafts having their rear ends attached to the axle and extending forward horizontally and bent upward and connected by a cross-bar, a body provided at its front with forwardly projecting bars 23, a leaf spring disposed transversely of the body and arranged at the back thereof, rear supporting coiled springs secured to the standards and having arms terminating over the axle, links connecting said arms with the leaf spring, stay straps connected to the standards and the leaf spring, supporting frames extending from the cross-bar, straps secured to the cross-bar and receiving the supporting frames, springs interposed between the supporting frames, and links connected with the latter straps and to the bars 23, substantially as described.

In testimony that I claim the foregoing as my own I have hereto affixed my signature in the presence of two witnesses.

JOHN A. KIRKPATRICK.

Witnesses:
H. R. TAYLOR,
ARTHUR W. ALLYN.